(12) United States Patent
Tan et al.

(10) Patent No.: US 9,160,579 B1
(45) Date of Patent: Oct. 13, 2015

(54) LOW PAPR MODULATION FOR COVERAGE ENHANCEMENT

(71) Applicant: Nokia Solutions and Networks Oy, Espoo (FI)

(72) Inventors: Jun Tan, Lake Zurich, IL (US); Weidong Yang, Hoffman Estates, IL (US); Rapeepat Ratasuk, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/225,803

(22) Filed: Mar. 26, 2014

(51) Int. Cl.
| | | |
|---|---|---|
| H04L 27/00 | (2006.01) | |
| H04L 25/03 | (2006.01) | |
| H04B 7/06 | (2006.01) | |
| H04B 7/04 | (2006.01) | |

(52) U.S. Cl.
CPC ........ *H04L 25/03834* (2013.01); *H04B 7/0478* (2013.01); *H04B 7/0617* (2013.01); *H04B 7/0669* (2013.01)

(58) Field of Classification Search
CPC ............ H04L 25/03343; H04L 1/0041; H04L 5/0023; H04L 2025/03426; H04B 10/5055; H04B 7/024; H04B 7/0617; H04B 7/0413; H04B 7/0452
USPC ................................................. 375/267, 296
See application file for complete search history.

(56) References Cited

U.S. PATENT DOCUMENTS

| | | | | |
|---|---|---|---|---|
| 5,249,200 | A * | 9/1993 | Chen et al. ..................... | 375/285 |
| 5,473,290 | A * | 12/1995 | Scomazzon et al. .......... | 332/103 |
| 6,597,746 | B1 * | 7/2003 | Amrany et al. ............... | 375/296 |
| 2005/0105635 | A1 * | 5/2005 | Harp et al. ..................... | 375/290 |

FOREIGN PATENT DOCUMENTS

WO     WO 0062436 A1     10/2000

OTHER PUBLICATIONS

Jun Tan, and Gordon L. Stuber, "Frequency-domain equalization for continuous phase modulation", Wireless Communications, IEEE Transactions on, vol. 4.5 (2005):2479-2490.
P. A. Laurent, "Exact and approximate construction of digital phase modulations by superposition of amplitude modulated pulses," IEEE Trans. Commun., vol. COM-34, pp. 150-160, 1986.

(Continued)

*Primary Examiner* — Don N Vo
(74) *Attorney, Agent, or Firm* — Harrington & Smith

(57) ABSTRACT

A method includes receiving a two-bit information stream comprising first and second bits and performing precoding using the two-bit information stream to determine multiple output signals. The precoding is performed to create a finite multiple of states for the output signals. The output signals comprise a first output signal based on a version of the first input bit and on a version of a second input bit, a second output signal based on a delayed version of the first input bit and the version of the second input bit, and a third output signal based on the version of first input bit and a delayed version of the second input bit. The method includes performing pulse shaping of each of the output signals to create pulse-shaped signals, combining the pulse-shaped signals to create a transmission waveform, and outputting the transmission waveform. Apparatus, computer programs, and computer program products are disclosed.

20 Claims, 8 Drawing Sheets

(56) References Cited

OTHER PUBLICATIONS

U. Mengali, M. Morelli, "Decomposition of M-ary CPM signals into PAM waveforms," IEEE Trans. IT, vol. 41, pp. 1265-1275, No. 5, Sep. 1995.

Kiran Kuchi ed: "Partial response DFT-precoded-OFDM modulation"; Internet Citation; May 10, 2012; pp. 632-645; XP002718527; Retrieved from the Internet: URL:http://onlinelibrary.wiley.com/doi/10.1002/ett.2518/pdf [retrieved on Jan. 10, 2014] abstract; 1. Introduction; 2. Transmitter.

Perrins E et al: "PAM decomposition of M-ary multi-H CPM"; IEEE Transactions on Communications; IEEE Service Center, Piscataway, NJ. USA; vol. 53, No. 12; Dec. 1, 2005; pp. 2006-2075; XP001512906; ISSN: 0090-6778; DOI: 10.1109/TCOMM.2005.860064; abstract; I. Introduction; II. Derivation of the PAM representation.

* cited by examiner

FIG. 7

| | Information bits | | | | Symbol phase (π/4 radius) | | | | Phase in unit of radius π/4 | | | | | | | | Inputs to pulses | | |
|---|---|---|---|---|---|---|---|---|---|---|---|---|---|---|---|---|---|---|---|
| | k=0 | | k=1 | | k=0 | | k=1 | | Before rotation | | | | After rotation | | | | k=1 | | |
| | Bit 0 | Bit 1 | Bit 0 | Bit 1 | Bit 0 | Bit 1 | Bit 0 | Bit 1 | k=0 a0 | k=0 a1 | k=1 a0 | k=1 a1 | k=0 b0 | k=0 b1 | k=1 b0 | k=1 b1 | u0k | u1k | u2k |
| 1 → | 0 | 0 | 0 | 0 | 0 | 0 | 0 | 0 | 0 | 0 | 0 | 0 | 0 | 0 | 2 | −1 | 1 | 7 | 2 |
| | 0 | 0 | 0 | 1 | 0 | 0 | 0 | 2 | 0 | 0 | 0 | 2 | 0 | 0 | 2 | 1 | 3 | 1 | 2 |
| | 0 | 0 | 1 | 0 | 0 | 0 | 4 | 0 | 0 | 0 | 4 | 0 | 0 | 0 | 6 | −1 | 5 | 7 | 6 |
| 4 → | 0 | 0 | 1 | 1 | 0 | 0 | 4 | 2 | 0 | 0 | 4 | 2 | 0 | 0 | 6 | 1 | 7 | 1 | 6 |
| 5 → | 0 | 1 | 0 | 0 | 0 | 2 | 0 | 0 | 0 | 2 | 0 | 0 | 0 | 2 | 2 | 1 | 1 | 1 | 4 |
| | 0 | 1 | 0 | 1 | 0 | 2 | 0 | 2 | 0 | 2 | 0 | 2 | 0 | 2 | 2 | 3 | 3 | 3 | 4 |
| | 0 | 1 | 1 | 0 | 0 | 2 | 4 | 0 | 0 | 2 | 4 | 0 | 0 | 2 | 6 | 1 | 5 | 1 | 0 |
| 8 → | 0 | 1 | 1 | 1 | 0 | 2 | 4 | 2 | 0 | 2 | 4 | 2 | 0 | 2 | 6 | 3 | 7 | 3 | 0 |
| 9 → | 1 | 0 | 0 | 0 | 4 | 0 | 0 | 0 | 4 | 0 | 0 | 0 | 4 | 0 | 2 | −1 | 1 | 3 | 2 |
| | 1 | 0 | 0 | 1 | 4 | 0 | 0 | 2 | 4 | 0 | 0 | 2 | 4 | 0 | 2 | 1 | 3 | 5 | 2 |
| | 1 | 0 | 1 | 0 | 4 | 0 | 4 | 0 | 4 | 0 | 4 | 0 | 4 | 0 | 6 | −1 | 5 | 3 | 6 |
| 12 → | 1 | 0 | 1 | 1 | 4 | 0 | 4 | 2 | 4 | 0 | 4 | 2 | 4 | 0 | 6 | 1 | 7 | 5 | 6 |
| 13 → | 1 | 1 | 0 | 0 | 4 | 2 | 0 | 0 | 4 | 2 | 0 | 0 | 4 | 2 | 2 | 1 | 3 | 5 | 4 |
| | 1 | 1 | 0 | 1 | 4 | 2 | 0 | 2 | 4 | 2 | 0 | 2 | 4 | 2 | 2 | 3 | 5 | 7 | 4 |
| | 1 | 1 | 1 | 0 | 4 | 2 | 4 | 0 | 4 | 2 | 4 | 0 | 4 | 2 | 6 | 1 | 7 | 5 | 0 |
| 16 → | 1 | 1 | 1 | 1 | 4 | 2 | 4 | 2 | 4 | 2 | 4 | 2 | 4 | 2 | 6 | 3 | 1 | 7 | 0 |

LOW PAPR MODULATION FOR COVERAGE ENHANCEMENT

TECHNICAL FIELD

This invention relates generally to wireless communications and, more specifically, to modulation techniques in wireless communication.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Machine-to-machine communication (M2M) or LTE machine-type communications (MTC) allow "machines" such as wireless devices, typically referred to as UEs, to communicate with each other. Meanwhile, millimeter wave (mmW) communication systems could be one of the potential 5th generation (5G) networks. These are important wireless communication technologies.

For MTC, there is a special interest group (SIG) formed with industry partners, operators and vendors that is set to agree on next-generation MTC standards, which will be proposed to 3GPP Rel. 13. The targets for the M2M SIG include the following:
  Enhanced coverage for MTC with special focus on meter reading devices with up to 20 dB additional coverage relative to current meter reading devices;
  Low cost devices, the complexity of which should be low enough to enable building of MTC UE devices for less than one dollar in United States currency; and
  UE current consumption should enable battery lifetime up to 20 years based on two AA batteries.

MTC devices in enhanced coverage mode usually need to transmit full power to meet the challenging uplink link budget. However, certain PA power back off power is needed to avoid transmission distortion, which will reduce the maximum transmission power of the UE. That is, many power amplifiers (PAs) are devices that tend to have higher distortion (e.g., nonlinearities) the higher the power output, at least over some range near the maximum output power of the PA. Assuming that distortion is a problem for a signal, intuitively, if a first signal has peaks that are close to an average value of the first signal, the average value of the first signal may be closer to the maximum power output of the PA while having a certain amount of distortion, as many of the peaks of the signal should not or will not enter the power output area of the PA where distortion occurs. However, if a second signal has peaks that are farther away from the average value of the second signal, the average value of the second signal will have to be farther away from (relative to a position of the first signal) the maximum power output of the PA while having the certain amount of distortion, as many of the peaks of the signal might otherwise enter the power output area of the PA where distortion occurs. The first signal (with less signal "spread" between the peaks and average) would typically have less power back off than would the second signal (with more signal spread between the peaks and average), which would have a relatively higher power back off.

There are a number of measures that quantify the waveform of a signal to determine what the spread of a signal is. The PAPR (peak-to-average power ratio) is one such measure, and is typically defined as the peak amplitude squared (providing the peak power) divided by the RMS (root-mean-square) value squared (providing the average power). The PAPR of a transmitting waveform will therefore determine PA back off power and thus the PAPR will affect the MTC UL coverage performance.

For a mmW network, due to high path loss over millimeter wave transmission, a cell-edge UE is usually transmitting full power with power back off. Similar to MTC devices, the PAPR property of the UE Tx waveform is also essential for mmW UL transmission.

Therefore, it would be beneficial to improve the PAPR property of modulation waveforms.

SUMMARY

This section contains examples of possible implementations and is not meant to be limiting.

An exemplary embodiment is a method, comprising: receiving a two-bit information stream comprising first and second bits; performing precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit; performing pulse shaping of each of the output signals to create pulse-shaped signals; combining the pulse-shaped signals to create a transmission waveform; and outputting the transmission waveform.

A method as described above, wherein: the version of the second input bit is a first version of the second input bit; performing precoding further comprises: applying a rotation to the first input bit to form the version of the first input bit, wherein the rotation applied to the first input bit is $j^k$, k=0 or 1; and applying a rotation to a second version of the second input bit to form the first version of the second input bit, wherein the rotation applied to the second version of the input bit is $e^{-j\pi k/4}$. A method as in this paragraph, wherein performing precoding further comprises: multiplying the second input bit by a delayed version of the second version of the input bit to form the first version of the second input bit. A method as in this paragraph, wherein: the first input bit is one of $\{+1, -1\}$; and the second input bit is one of $\{+1, +j\}$.

A method as above, wherein performing precoding further comprises: determining the first output signal by multiplying the version of the first input bit and the version of the second input bit; determining the second output signal by multiplying the delayed version of the first input bit and the version of the second input bit; and determining the third output signal by multiplying the version of first input bit and the delayed version of the second input bit.

A method as above, wherein performing pulse shaping further comprises applying a pulse shaping function to each of the first, second, and third output signals, wherein each pulse shaping function comprises:

$$c_i(t) = w_i(t) \cdot w_i(t+T),$$

where l=0, 1, T is a sampling period, $$w_l(t) = \begin{cases} \dfrac{\sin[2^{l+1}h\pi q(t)]}{\sin[2^l h\pi]} & 0 \le t \le LT \\ w_l(2LT - t) & LT < t \le 2LT \\ 0 & \text{elsewhere} \end{cases},$$

where h=¼, and a partial response function q(t) takes the form of: $q(t) = \int_{-\infty}^{t} f(\tau) d\tau$, f(t) is a shaping function with non-zero value defined over [0, LT], and $f(t) = f(LT-t)$ $\int_0^{LT} f(\tau)d\tau = q(LT) = ½$. A method of this paragraph, wherein: the pulse shaping functions are as follows:

$g_0(t) = c_0(t)c_1(t)$ $g_1(t) = c_0(t+T)c_1(t)$ $g_2(t) = c_0(t)c_0(t+T)$, where $g_0(t)$ is applied to the first output signal to create a first pulse-shaped signal, $g_1(t)$ is applied to the second output signal to create a second pulse-shaped signal, $g_2(t)$ is applied to the third output signal to create a third pulse-shaped signal; and combining the pulse-shaped signals comprises adding the first, second and third pulse-shaped signals to create the transmission waveform.

A method as above, wherein performing precoding further produces a fourth output signal on an extra branch, the fourth output signal based on the delayed version of the first input bit and a delayed version of the second input bit.

A method as above, wherein performing precoding further comprises adding one or more branches producing additional output signals, wherein each of the one or more branches having multiple delays per branch.

A method as above, wherein performing pulse shaping further comprises performing pulse shaping for each of the output signals in a time domain by applying a discrete sequence with a filter with an impulse response of a corresponding pulse shaping function.

A method as above, wherein performing pulse shaping is performed for each output signal using a corresponding pulse shaping function and performing pulse shaping further comprises performing pulse shaping for each of the output signals in a frequency domain using a frequency-domain shaping function that is obtained with a discrete Fourier transform of samples of a corresponding one of the pulse shaping functions.

In a further exemplary embodiment, an apparatus comprises: a precoder receiving a two-bit information stream comprising first and second bits, the precoder configured to perform precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit; a plurality of pulse shaping functions, each pulse shaping function performing pulse shaping of each of the output signals to create pulse-shaped signals; a combiner configured to combine the pulse-shaped signals to create a transmission waveform and configured to output the transmission waveform.

An apparatus as above, wherein: the version of the second input bit is a first version of the second input bit; the precoder further comprises: a multiplier that applies a rotation to the first input bit to form the version of the first input bit, wherein the rotation applied to the first input bit is $j^k$, k=0 or 1; and a multiplier that applies a rotation to a second version of the second input bit to form the first version of the second input bit, wherein the rotation applied to the second version of the input bit is $e^{-j\pi k/4}$. An apparatus as in this paragraph, wherein the precoder further comprises: a delay that delays the second version of the input bit to create a delayed version of the second version of the second input bit; and a multiplier that multiplies the second input bit by the delayed version of the second version of the second input bit to form the second version of the second input bit. An apparatus as in this paragraph, wherein: the first input bit is one of {+1, −1}; and the second input bit is one of {+1, +j}.

An apparatus as disclosed above, wherein the precoder further comprises: a multiplier that determines the first output signal by multiplying the version of the first input bit and the version of the second input bit; a multiplier that determines the second output signal by multiplying the delayed version of the first input bit and the version of the second input bit; and a multiplier that determines the third output signal by multiplying the version of first input bit and the delayed version of the second input bit.

An apparatus as above, wherein each pulse shaping function comprises:

$c_l(t) = w_l(t) \cdot w_l(t+T)$, where l=0, 1, T is a sampling period, $$w_l(t) = \begin{cases} \dfrac{\sin[2^{l+1}h\pi q(t)]}{\sin[2^l h\pi]} & 0 \le t \le LT \\ w_l(2LT - t) & LT < t \le 2LT \\ 0 & \text{elsewhere} \end{cases},$$

where h=¼, and a partial response function q(t) takes the form of $q(t) = \int_{-\infty}^{t} f(\tau) d\tau$, f(t) is a shaping function with non-zero value defined over [0, LT], and $f(t) = f(LT-t)$ $\int_0^{LT} f(\tau)d\tau = q(LT) = ½$. An apparatus as in this paragraph, wherein: the pulse shaping functions are as follows:

$g_0(t) = c_0(t)c_1(t)$ $g_1(t) = c_0(t+T)c_1(t)$ $g_2(t) = c_0(t)c_0(t+T)$, where $g_0(t)$ is applied to the first output signal to create a first pulse-shaped signal, $g_1(t)$ is applied to the second output signal to create a second pulse-shaped signal, $g_2(t)$ is applied to the third output signal to create a third pulse-shaped signal; and the combiner is an adder that adds the first, second and third pulse-shaped signals to create the transmission waveform.

An apparatus as above, further comprising one or more processors and one or more memories including computer program code, wherein the one or more memories and the computer program code configured, with the one or more processors, to cause the apparatus to implement the precoder, the plurality of pulse shaping functions, and the combiner.

An exemplary apparatus includes one or more processors and one or more memories including computer program code. The one or more memories and the computer program code are configured to, with the one or more processors, cause the apparatus to perform at least the following: receiving a two-bit information stream comprising first and second bits; performing precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit; performing pulse shaping of each of the output signals to create pulse-shaped signals; combining the pulse-shaped signals to create a transmission waveform; and outputting the transmission waveform.

An exemplary computer program product includes a computer-readable storage medium bearing computer program code embodied therein for use with a computer. The computer program code includes: code for receiving a two-bit information stream comprising first and second bits; code for performing precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit; performing pulse shaping of each of the output signals to create pulse-shaped signals; code for combining the pulse-shaped signals to create a transmission waveform; and outputting the transmission waveform.

An exemplary embodiment is an apparatus, comprising: means for receiving a two-bit information stream comprising first and second bits; means for performing precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit; performing pulse shaping of each of the output signals to create pulse-shaped signals; means for combining the pulse-shaped signals to create a transmission waveform; and outputting the transmission waveform.

An apparatus as described above, wherein: the version of the second input bit is a first version of the second input bit; the means for performing precoding further comprises: means for applying a rotation to the first input bit to form the version of the first input bit, wherein the rotation applied to the first input bit is $j^k$, k=0 or 1; and means for applying a rotation to a second version of the second input bit to form the first version of the second input bit, wherein the rotation applied to the second version of the input bit is $e^{-j\pi k/4}$. An apparatus as in this paragraph, wherein the means for performing preceding further comprises: means for multiplying the second input bit by a delayed version of the second version of the input bit to form the first version of the second input bit. An apparatus as in this paragraph, wherein: the first input bit is one of $\{+1, -1\}$; and the second input bit is one of $\{+1, +j\}$.

An apparatus as above, wherein the means for performing precoding further comprises: means for determining the first output signal by multiplying the version of the first input bit and the version of the second input bit; means for determining the second output signal by multiplying the delayed version of the first input bit and the version of the second input bit; and means for determining the third output signal by multiplying the version of first input bit and the delayed version of the second input bit.

An apparatus as above, wherein the means for performing pulse shaping further comprises means for applying a pulse shaping function to each of the first, second, and third output signals, wherein each pulse shaping function comprises:

$$c_l(t) = w_l(t) \cdot w_l(t+T),$$

where l=0, 1, T is a sampling period, $$w_l(t) = \begin{cases} \dfrac{\sin[2^{l+1}h\pi q(t)]}{\sin[2^l h\pi]} & 0 \leq t \leq LT \\ w_l(2LT - t) & LT < t \leq 2LT \\ 0 & \text{elsewhere} \end{cases},$$

where h=¼, and a partial response function q(t) takes the form of: $q(t) = \int_{-\infty}^{t} f(\tau) d\tau$, f(t) is a shaping function with non-zero value defined over [0, LT], and $$f(t) = f(LT - t)$$

$\int_0^{LT} f(\tau) d\tau = q(LT) = ½$. An apparatus of this paragraph, wherein: the pulse shaping functions are as follows:

$$g_0(t) = c_0(t) c_1(t)$$

$$g_1(t) = c_0(t+T) c_1(t)$$

$$g_2(t) = c_0(t) c_0(t+T),$$

where $g_0(t)$ is applied to the first output signal to create a first pulse-shaped signal, $g_1(t)$ is applied to the second output signal to create a second pulse-shaped signal, $g_2(t)$ is applied to the third output signal to create a third pulse-shaped signal; and the means for combining the pulse-shaped signals comprises means for adding the first, second and third pulse-shaped signals to create the transmission waveform.

An apparatus as above, wherein the means for performing precoding further produces a fourth output signal on an extra branch, the fourth output signal based on the delayed version of the first input bit and a delayed version of the second input bit.

An apparatus as above, wherein the means for performing precoding further comprises means for adding one or more branches producing additional output signals, wherein each of the one or more branches having multiple delays per branch.

An apparatus as above, wherein the means for performing pulse shaping further comprises means for performing pulse shaping for each of the output signals in a time domain by applying a discrete sequence with a filter with an impulse response of a corresponding pulse shaping function.

An apparatus as above, wherein the means for performing pulse shaping is performed for each output signal using a corresponding pulse shaping function and the means for performing pulse shaping further comprises means for performing pulse shaping for each of the output signals in a frequency domain using a frequency-domain shaping function that is obtained with a discrete Fourier transform of samples of a corresponding one of the pulse shaping functions.

BRIEF DESCRIPTION OF THE DRAWINGS

In the attached Drawing Figures:

FIG. 7 is a table of states and information determining the states for a finite state machine precoder in FIG. 6;

DETAILED DESCRIPTION OF THE DRAWINGS

Figure 1:
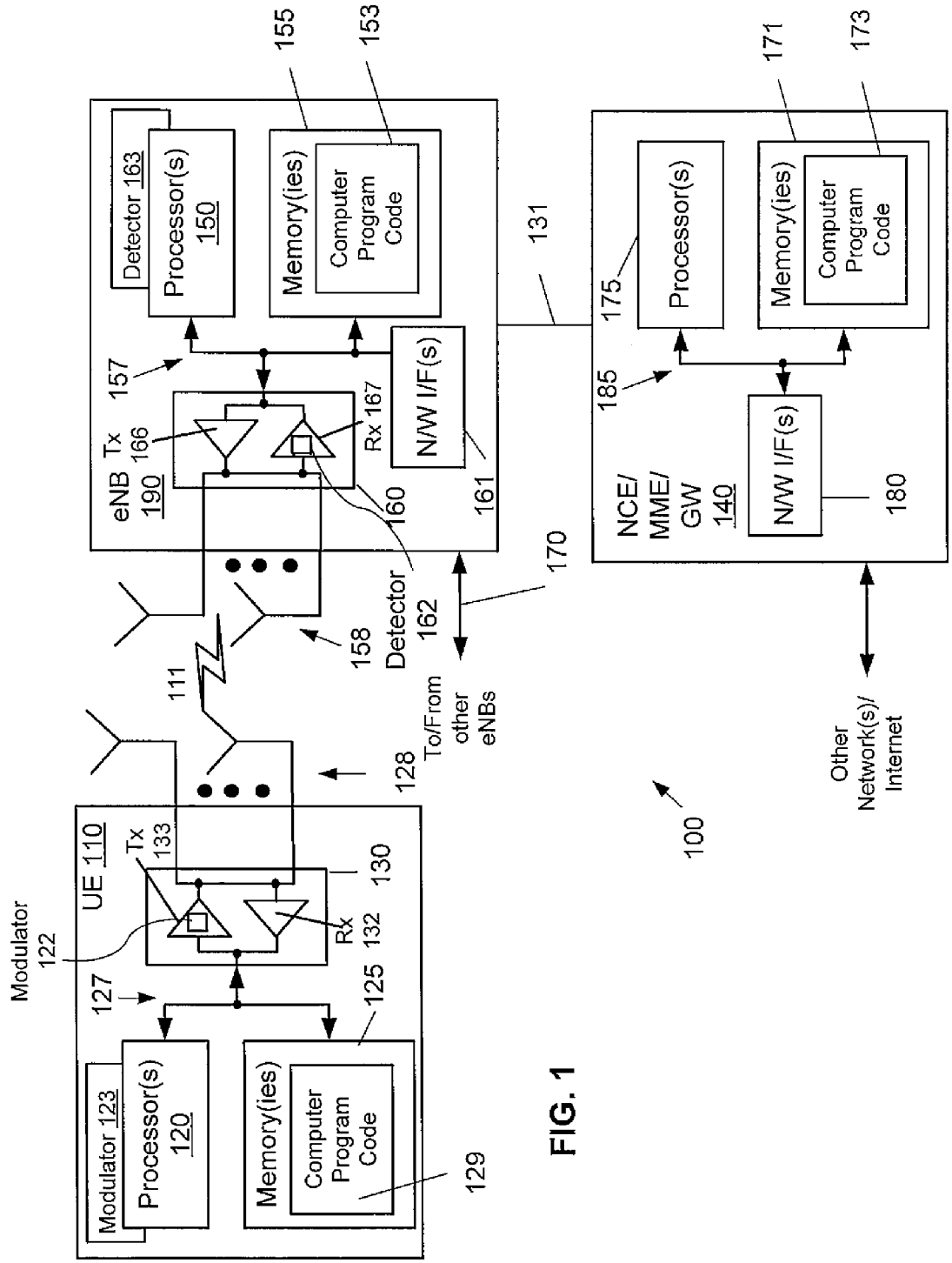
FIG. 1 illustrates an exemplary system suitable for practicing exemplary embodiments herein.

Before proceeding with additional description of possible problems with conventional techniques, reference is made to FIG. 1, which shows a block diagram of an exemplary system in which the exemplary embodiments may be practiced. In FIG. 1, a UE 110 is in wireless communication with a network 100. The user equipment 110 includes one or more processors 120, one or more memories 125, and one or more transceivers 130 (each comprising a receiver, Rx, 132 and a transmitter, Tx, 133) interconnected through one or more buses 127. The one or more transceivers 130 are connected to one or more antennas 128. The one or more memories 125 include computer program code 129. In an exemplary embodiment, the one or more memories 125 and the computer program code 129 are configured to, with the one or more processors 120, cause the user equipment 110 to perform one or more of the operations as described herein. For instance, a modulator 123 performs modulation as described herein and could be implemented in part or completely in computer program code 129 that is loaded into the one or more processors 120. As another example, a modulator 122 could be implemented as hardware logic in part of the transmitter, Tx, 133. Furthermore, the transmitter 133 may include a processor such as a processor 120 (e.g., and one or more memories 125) that performs the modulation operations as described herein. Furthermore, the combination of hardware and software elements, the software elements implemented by the one or more processors 120, may be used. The UE 110 communicates with eNB 190 via link 111.

The eNB 190 includes one or more processors 150, one or more memories 155, one or more network interfaces (N/W I/F(s)) 161, and one or more transceivers 160 (each comprising a receiver, Rx, 167 and a transmitter, Tx, 166) interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNB 190 to perform one or more of the operations as described herein. A detector 163 performs detection as described herein and may be implemented as computer program code 153, which is loaded into the one or more processors 150 for execution. As another example, a detector 162 could be implemented as hardware logic in part of the receiver 167. Furthermore, the receiver 167 may include a processor such as a processor 150 (e.g., and one or more memories 155) that performs the detection operations as described herein. Furthermore, the combination of hardware and software elements, the software elements implemented by the one or more processors 150, may be used.

The one or more network interfaces 161 communicate over a network such as the networks 170 and 131. Two or more eNBs 190 communicate using, e.g., network 170. The network 170 may be wired or wireless or both and may implement, e.g., an X2 interface.

The wireless network 100 may include a network control element (NCE) 140 that may include MME/SGW functionality, and which provides connectivity with a further network, such as a telephone network and/or a data communications network (e.g., the Internet). The eNB 190 is coupled via a network 131 to the NCE 140. The network 131 may be implemented as, e.g., an S1 interface. The NCE 140 includes one or more processors 175, one or more memories 171, and one or more network interfaces (N/W I/F(s)) 180, interconnected through one or more buses 185. The one or more memories 171 include computer program code 173. In an exemplary embodiment, the one or more memories 171 and the computer program code 173 are configured to, with the one or more processors 175, cause the NCE 140 to perform one or more operations as described herein.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, meter devices, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Returning to a description of MTC and mmW devices and conventional systems, compared to typical UE devices, MTC devices and/or mmW devices usually need advanced techniques to meet a coverage shortfall due to a limited link budget, especially for uplink, where transmit power and transmit antennas are limited. For the LTE MTC study described above, the enhanced coverage for MTC with a special focus on meter reading requires a 20 dB additional coverage. For mmW UE, due to high path loss of millimeter wave transmission, the link budget for the UE is challenging to provide a large area coverage. The limitation of UL Tx antenna poses further challenges for uplink transmission. These systems need every advanced technique to ensure reliable communication for UL, where UE has limited Tx power and a limited number of Tx antennas.

Under these scenarios, a UE usually operates at its full transmit power. However, due to the peak-to-average power ratio (PAPR) property of the transmit waveform, a UE's PA does not transmit at full power and the UE backs off the power for the PA by a certain dB depending on the transmission waveform's PAPR, so that the overall transmission waveform does not suffer from non-linear distortion. The power back off will reduce the UL transmit power, and thus the back off will further limit UL coverage. The amount of PA back off power depends on the PAPR value of the transmit waveform among other things, which is one of the limiting factors for UL transmission.

For the air link to achieve high spectral efficiency, a low value of PA power back off is desirable for a UE. Ideally, the UL transmission waveform shall have low PAPR. Continuous phase modulation (CPM) has a minimum PAPR value (relative to other modulations) with PAPR=0dB. For example, GSM/EDGE systems use GMSK modulation, which is a special type of CPM. However, GMSK modulation is a low-order (binary) modulation, equivalent to BPSK modulation. High order CPM is possible; however, the high order CPM usually needs a complicated equalizer, which limits the practical application of M-ary CPM when M>2.

For high order linear modulation such as QPSK and 16QAM, LTE UL uses DFT-S-OFDM to provide single-carrier modulation for low PAPR transmission. One design of mmW 5G uses null-CP single carrier modulation based on π/4 shifted QPSK/16QAM. Its PAPR is lower than that of an OFDM waveform; however, the PAPR is still much higher than that of GMSK modulation.

This invention proposes a low PAPR modulation for, e.g., 4-ary modulation.

It is beneficial at this point to review concepts about modulation. Linear modulation such as BPSK/QPSK can reduce PAPR with phase rotation, which yields alternative modulation schemes such as π/2-BPSK, and π/4-QPSK. These modulation schemes are described below.

Figure 2:
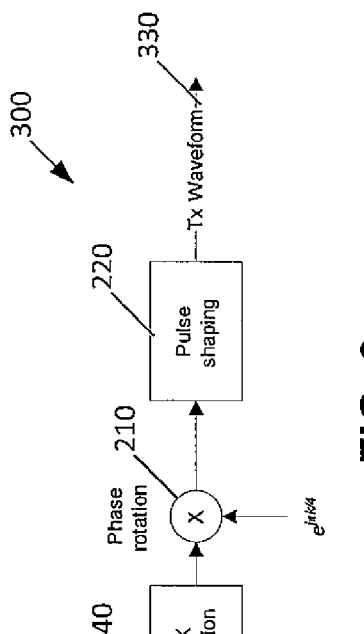
FIG. 2 is an illustration of a system for $\pi/2$-BPSK modulation.

Regarding π/2-BPSK modulation, a system 200 for π/2-BPSK modulation is illustrated in FIG. 2. Phase rotation is performed by a multiplier 210, and a pulse shaping function 220 is applied to shape the output Tx waveform 230 as well as the PAPR property.

Figure 3:
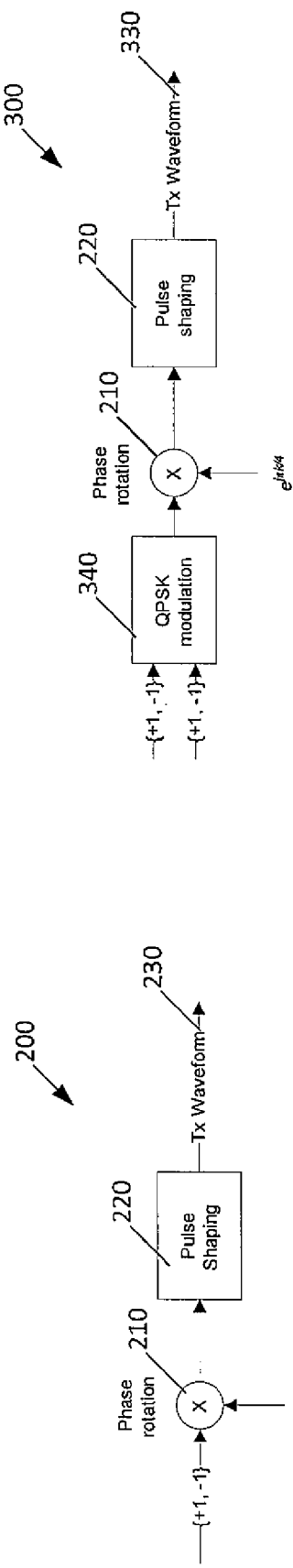
FIG. 3 is an illustration of a system for $\pi/4$-QPSK modulation.

Regarding, π/4-QPSK, for 2-bit (4-ary) modulation such as QPSK, π/4-QPSK is an effective approach to reduce the PAPR performance. FIG. 3 shows a system 300 for π/4-QPSK modulation, where QPSK modulation 340 is applied to a phase rotation by multiplier 210, and a pulse shaping function 220 is applied to shape the output Tx waveform 330 as well as the PAPR property.

Figure 4:
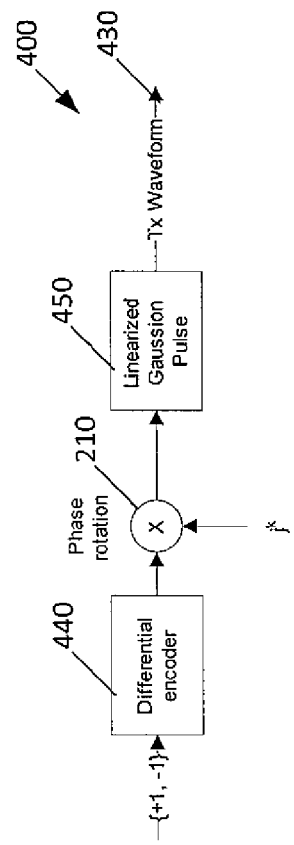
FIG. 4 is an illustration of a system for an approximation of GMSK modulation (LGMSK)

Continuous phase modulation (CPM) is a non-linear modulation in general. However, based on Laurent's decomposition (see, e.g., P. A. Laurent, "Exact and approximate construction of digital phase modulations by superposition of amplitude modulated pulses," IEEE Trans. Commun., vol. COM-34, pp. 150-160, 1986), CPM can be approximated with a combination of linear modulation. Motivated by the idea, GMSK modulation can be approximated as a combination of a differential encoder, a phase rotator, and a pulse shaping filter, shown in the system 400 of FIG. 4. This version of GMSK is called linearized GMSK (LGMSK) modulation. The differentially encoded bits (from the differential encoder 440) are phase rotated by π/2 at every time sample. The rotated symbols pass through the pulse shaping function 450, of which the impulse response is a linearized Gaussian pulse, to generate the Tx waveform 430. Note that LGMSK is similar to π/2-BPSK modulation, after the differential encoder, from the comparison of FIGS. 2 and 4.

Figure 5:
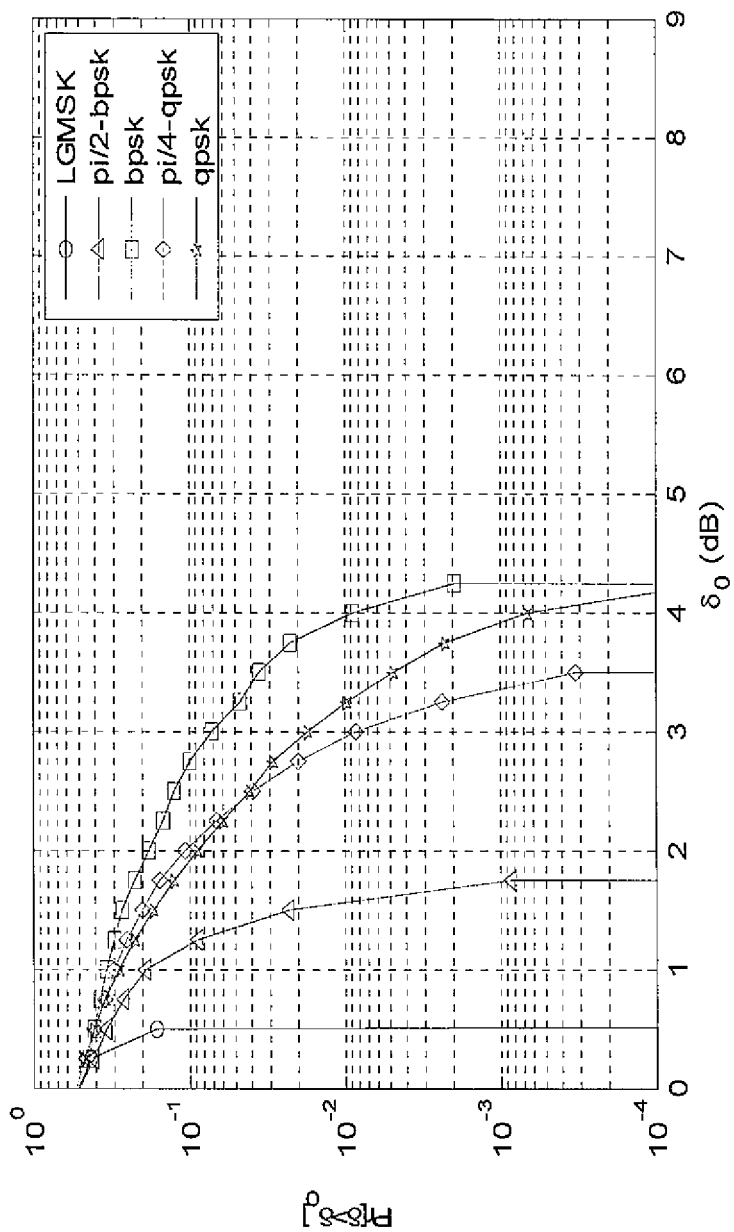
FIG. 5 is graph of PAPR performance for a number of modulation schemes.

The PAPR performance of these modulation schemes is shown in FIG. 5. The pulse shaping of linear modulation is the RRC (raised root cosine) pulse with roll-factor of 0.3. The PAPR of LGMSK, which is an approximation of GMSK, has the lowest values among these binary and quaternary modulation schemes. It should be noted that $\delta_0$ is a given PAPR (in dB) and $Pr[\delta > \delta_0]$ is a probability that a PAPR is above the given PAPR.

Exemplary embodiments herein use linear modulation with combination of precoding and pulse shaping to achieve low-PAPR transmission waveform for, e.g., quaternary (2-bit) transmission.

An exemplary embodiment is motivated by the LGMSK modulation, which is a linearized version of GMSK based on Laurent decomposition. For the Laurent decomposition, see P. A. Laurent, "Exact and approximate construction of digital phase modulations by superposition of amplitude modulated pulses," IEEE Trans. Commun., vol. COM-34, pp. 150-160, 1986. A similar process is extended to quaternary CPM to yield a low-PAPR modulation, based on the decomposition of M-ary CPM. For the decomposition of M-ary CPM, see U. Mengali, M. Morelli, "Decomposition of M-ary CPM signals into PAM waveforms," IEEE Trans. IT, vol. 41, pp. 1265-1275, No. 5, September 1995.

Figure 6:
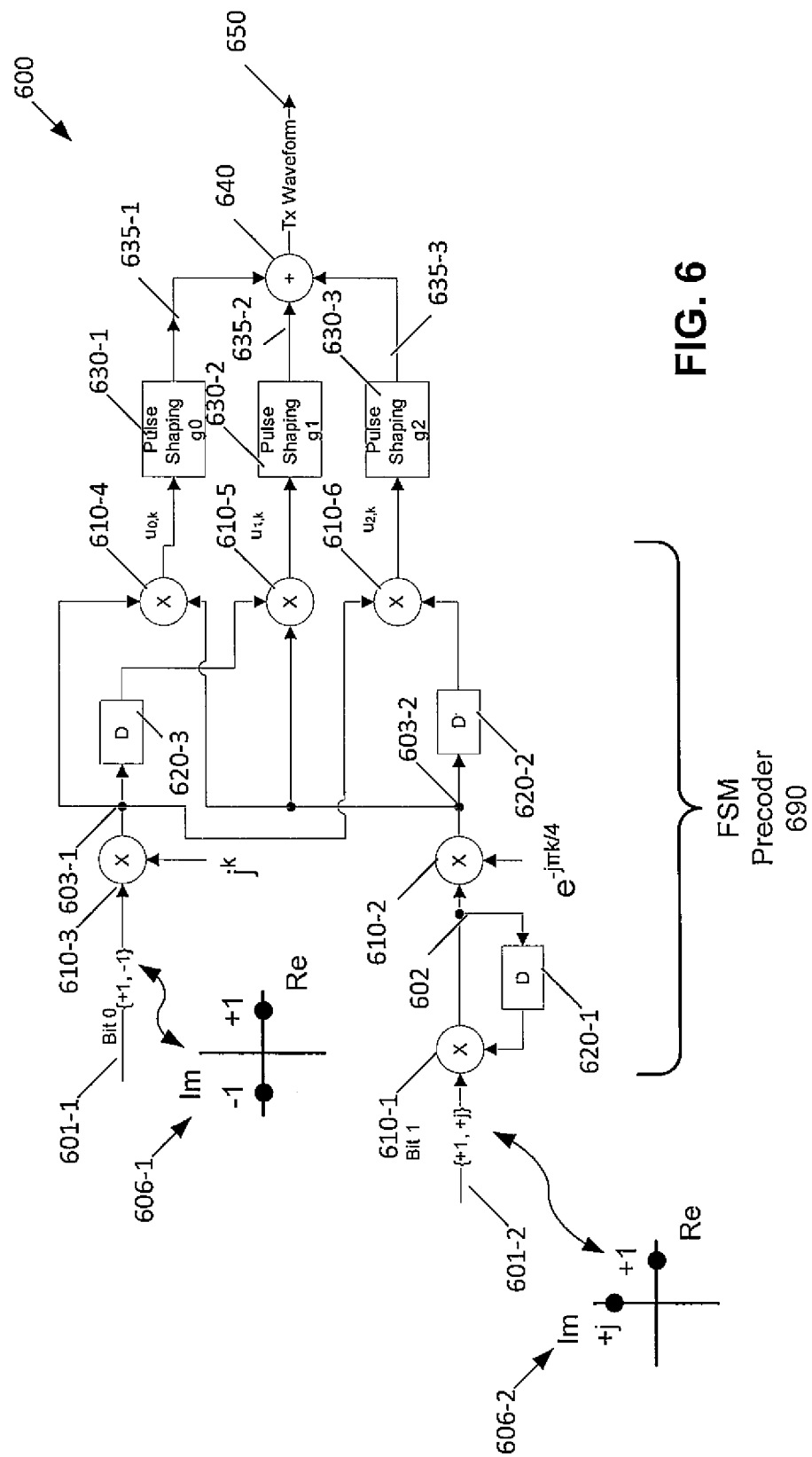
FIG. 6 is an illustration of a modulator in an exemplary embodiment for low-PAPR modulation with 4-ary modulation (e.g., L=2)

One exemplary embodiment is shown FIG. 6, where 2-bit modulation is demonstrated. Bit 0 is {+1, −1} and Bit 1 is {+1, +j}. The modulator 600 may be a modulator 122, implemented as hardware logic in the transmitter 133, or the modulator 123, implemented as computer program code 123, or some combination of these. The modulator 600 has six multipliers 610-1 through 610-6, three delays D 620-1, 620-2, and 620-3, three pulse shaping functions 630-1, 630-2, and 630-3 that create pulse-shaped signals 635-1, 635-2, and 635-3, respectively, and a combiner 640 (in this example, an adder) that ultimately produces the Tx waveform 650. The combiner 640 may also perform other operations, such as subtraction.

The 2-bit information stream passes through a finite-state-machine (FSM) precoder 690 to achieve multiple branches, each of which is shaped with a pulse shaping function $g_k(t)$ 630. The FSM precoder 690 includes the multipliers 610 and the delays 620 and produces output signals $u_{0,k}$, $u_{1,k}$, and $u_{2,k}$, which are based on multiplications of a version of Bit 0 and a version of Bit 1, a delayed version of Bit 0 and a version of Bit 1, and a version of Bit 0 and a delayed version of Bit 1, respectively. The outputs of pulse shaping functions 630 are combined via adder 640 to generate the Tx waveform 650 for the 2-bit information.

Referring to FIG. 7 in addition to FIG. 6, in FIG. 7 a table is shown of states and information determining the states for the finite state machine precoder 690 in FIG. 6. There are 16 states 760-1 through 750-16 of the finite state machine precoder 690, and the information in references 710, 730, and 740 are used to determine the states 760 (which are in the column 750 labeled as "inputs to pulses" for k=1). There are 16 rows are that are marked 1 through 16. The information bits 710 are the information bits in Bit 0 at location 601-1 and the information bits in Bit 1 at location 601-2 for k=0 and k=1.

A zero ("0") for Bit 0 indicates +1, while a one ("1") for Bit 0 indicates −1. A zero ("0") for Bit 1 indicates +1, while a one ("1") for Bit 1 indicates +j. The symbol phase 720, before rotation information 730, after rotation information 740 and inputs to pulses 750 are shown as phase in units of radius π/4. The possible units of radius π/4 are 0, π/4, π/2, 3π/4, π, 5π/4, 3π/2, and 7π/4, for a circle in units of radians. It should also be noted that 7π/4 (or 7 in the table)=−π/4 (or −1 in the table).

The symbol phase 720 is the information bits 710 converted to units of radius π/4. For instance, the information bits 710 for row 10 is {1001} for k=0 (left two bits, 10) and k=1 (right two bits, 01). The information bit Bit 0 for k=0 is shown as 1, which means the value of the bit is −1. The value of −1 converted to symbol phase 720 is 4, which corresponds to 4π/4 or π. This can be seen using the graph 606-1 of the complex plane (where Re=real and Im=imaginary) for the Bit 0 input. That is, (−1, 0) (written as (real, imaginary)) is at π in terms of radians or 4 units of π/4 as shown in FIG. 7. Similarly, the information bit Bit 0 for k=1 is shown as 0, which means the value of the bit is +1. The value of +1 converted to symbol phase 720 is zero, which corresponds to 0π/4. This can be seen using the graph 606-1 of the complex plane for the Bit 0 input. That is, (+1, 0) is at 0 (zero) in terms of radians or zero units of π/4 as shown in FIG. 7.

The information bit Bit 1 for k=0 is shown as 0, which means the value of the bit is +1. The value of +1 converted to symbol phase 720 is 0, which corresponds to 0π/4. This can be seen using the graph 606-2 of the complex plane for the Bit 1 input. That is, (+1, 0) is at zero in terms of radians or zero units of π/4 as shown in FIG. 7. Similarly, the information bit Bit 1 for k=1 is shown as 1, which means the value of the bit is +j. The value of +j converted to symbol phase 720 is 2, which corresponds to 2π/4. This can be seen using the graph 606-2 of the complex plane for the Bit 1 input. That is, (0, +j) is at 2π/4 or π/2 in terms of radians or two units of π/4 as shown in FIG. 7.

The before rotation information 730 is used to illustrate what happens at location 602 based on the delay 620-1. It is noted that the delay 620-1 is a differential encoding in the complex plane. The a0 information for k=0 and k=1 in the before rotation information 730 is unchanged from the Bit 0 information for k=0 and k=1 in the symbol phase 720. Only the a1 information changes between the symbol phase 720 and the before rotation information 730. An example is now provided for row 10 (ten). In the example of row 10 (ten), a1 does not change for either k=0 or k=1 relative to what is shown in symbol phase 720. For k=0, there is no delayed version of Bit 1 for the delay 620-1, so a1 for k=0 is always the same as Bit 1 for k=0. For k=1, Bit 1 for k=0 is +1 and Bit 1 for k=1 is +j and the delay 620-1 and multiplier 610-1 act to multiply Bit 1 for k=0 by Bit 1 for k=1, which is (+1×+j=+j), which means that a1 for k=1 in the before rotation information 730 is +j, which is the same as the +j for Bit 1 in the symbol phase 720.

The after rotation information 740 shows a0 after rotation by $j^k$ and a1 after rotation by $e^{-j\pi k/4}$ for k=0 ($j^0=e^0=1$) and k=1 ($j^1=j$, which applied a 90 degree or π/2 phase shift; $e^{-j\pi/4}=e^{-j\pi/4}$, which applies a −45 degree or −π/4 phase shift). The after rotation information 740 illustrates what occurs at locations 603-1 (for Bit 0) and 603-2 (for Bit 1) in FIG. 6. So, for k=0, neither bit a0 nor bit a1 is rotated, so b0=a0 and b1=0 for k=0. For k=1, the a0 is rotated by j, which applies a π/2 phase shift, and thus 0 degrees for a0 is rotated to π/2, which is 2π/4 or 2 in the table. The a1 for k=1 of 2 (2π/4 or π/2) is rotated by $e^{-j\pi/4}=e^{-j\pi/4}$, which applies a −π/4 phase shift, and thus is rotated to 1 or π/4.

The states 750 are determined for k=1 as follows: $u_{0,1}$=(b0 for k=1)×(b1 for k=1); $u_{1,1}$=(b0 for k=0)×(b1 for k=1); $u_{2,1}$= (b0 for k=1)×(b1 for k=0). Therefore, $u_{0,1}$=("2")×("1")=2π/4 (that is, j)×1 at an angle of π/4, and j provides π/2 rotation, so the result is 1 at an angle of 3π/4 or 3 as indicated in the table. Similarly, $u_{1,1}$=(b0 for k=0)×(b1 for k=1), which is ("4")× ("1"), which is −1×1 at an angle of π/4, so the result is 1 at an angle of 5π/4 or 5 as indicated in the table. This can be seen if 1 at an angle of π/4 is considered to be a+aj (where $1^2=a^2+a^2$), and the calculation is (−1+0j)(a+aj)=(−1a+0ja+−1aj+0jaj)= (−a+0−aj+0)=(−a−aj), which is 1 at an angle of 5π/4 or 5 as indicated in the table. Regarding $u_{2,1}$=(b0 for k=1)×(b1 for k=0), which is ("2")×("0"), which is 2π/4 (that is, j)×1 at an angle of zero, and j provides a π/2 rotation, so the result is 1 at an angle of two or 2 as indicated in the table.

The other entries in FIG. 7 may be similarly determined using the techniques shown for row 10. One note is that the before rotation information 730 and the symbol phase 720 for a1 for k=1 and Bit 1 for k=1 are the same in row 10. In row 14, Bit 1 for k=1 is 2, but a1 for k=1 is 4. This occurs because the delay 620-1 and the multiplier 610-1 act as follows. The bit a1=Bit 1 for k=0 multiplied by Bit 1 for k=1, which is ("2")× ("2"), or 1 at 2π/4 or π/2 (i.e., j) multiplied by 1 at 2π/4 or π/2 (i.e., j), which is j×j=−1, and −1 on the real axis is 1 at 4π/4 (i.e., π) or 4 as in the table.

It is noted that any time state will cause a state transition. For instance, in terms of the states, if bits 0 and 1 for both k=0 and k=1 are 0000, and then two new bits (say 11) come in for k=2, the state at k=2 is 0011, where "00" indicates the k=1 stage and "11" indicates the current k=2 stage. Therefore, there is a state transition from 0000 to 0011.

The precoding performed by the FSM precoder 690 and the associated pulse shaping functions 630 are related to ensure low PAPR waveform. Although the relationship between the FSM precoder 690 and the associated pulse shaping functions 630, briefly it can be said that pulse shaping function $g_0(t)$ (described below) has the largest power and $g_0(t)$ itself serves as a QPSK modulation pulse. Pulse $g_1(t)$ and $g_2(t)$ may be thought of as trying to compensate for "ripples" of the g0-modulated waveform to keep the PAPR low. The FSM precoder 690 correlates the modulated information between $g_0$, and $g_1/g_2$. The details of precoder and pulse shaping function design are based on linear decomposition of continuous phase modulation (CPM). However, the output of the transmission waveform is neither a CPM signal, nor an approximation of CPM as LGMSK is an approximation of GMSK.

The associated pulse shaping function 630 can be defined as the following:

$$c_l(t)=w_l(t)\cdot w_l(t+T),$$

where l=0, 1, T is a sampling period, and $$w_l(t)=\begin{cases} \dfrac{\sin[2^{l+1}h\pi q(t)]}{\sin[2^l h\pi]} & 0\leq t\leq LT \\ w_l(2LT-t) & LT<t\leq 2LT \\ 0 & \text{elsewhere} \end{cases},$$

where L=2.

Let h=¼, and the related partial response function q(t) takes the form of the following:

$$q(t)=\int_{-\infty}^{t} f(\tau)d\tau,$$

and f(t) is a shaping function with non-zero value defined over [0, LT], and $$f(t)=f(LT-t)$$

$$\int_0^{LT} f(\tau)d\tau = q(LT) = \tfrac{1}{2}.$$

With these definitions, the pulse shaping functions 630 for three branches are the following:

$$g_0(t)=c_0(t)c_1(t)$$

$$g_1(t)=c_0(t+T)c_1(t).$$

$$g_2(t)=c_0(t)c_0(t+T)$$

The values used for h and L are for the specific example above and the techniques herein are not limited to such values.

The pulse shaping is usually applied in the time domain. The discrete sequence is applied with a filter with impulse response of a corresponding pulse shaping function to yield the shaped waveform. With DFT-S-OFDM such as LTE uplink, the pulse shaping function can be applied in frequency domain to yield a low-PAPR waveform. The frequency-domain shaping function $G_k$ can be obtained with a OFT of the samples of the pulse shaping function $g_k(t)$.

In an exemplary embodiment such as that shown in FIG. 6, three branches with three pulse shaping functions 630 are used. Another embodiment is to apply an extra bit at the output of the FSM precoder 690 to shape the waveform for better PAPR. For instance, another branch could be based on multiplication between a delayed Bit 0 and a delayed Bit 1 and a corresponding pulse shaping function $g_3$. Furthermore, extra branches based on extra encoded bits by the FSM can be applied to yield better PAPR performance. Illustratively, the FSM precoder 690 can still have more than one delay. For example, if two delays are introduced, it is possible to apply additional extra bits (with their corresponding pulse shaping and extra branches) to shape the transmission waveform 650.

An alternative embodiment is to use fractional modulation at the input of the FSM precoder 390. In an exemplary embodiment, two bits are the input for quaternary modulation. However, a portion of the input bits can be used as "shaping" bits, which depends on the waveform PAPR property. Overall modulation index will be a fraction of the 2-bit modulation. The shaping bits could be used to further reduce PAPR performance.

An alternative embodiment is the application of unequal protection of bit streams, such as data/control streams. Note that Bit 1 is less protected than Bit 0. Bit 0 could be more suitable for a control signal than Bit 1. That is, Bit 0 is {+1, −1}, and Bit 1 is {+1, +j}. The Euclidean distance of Bit 1 in the complex domain is closer than the Euclidean distance of Bit 0. Therefore, Bit 1 is less protected than Bit 0 (e.g., in term of bit error rate under a noisy channel).

Figure 8:
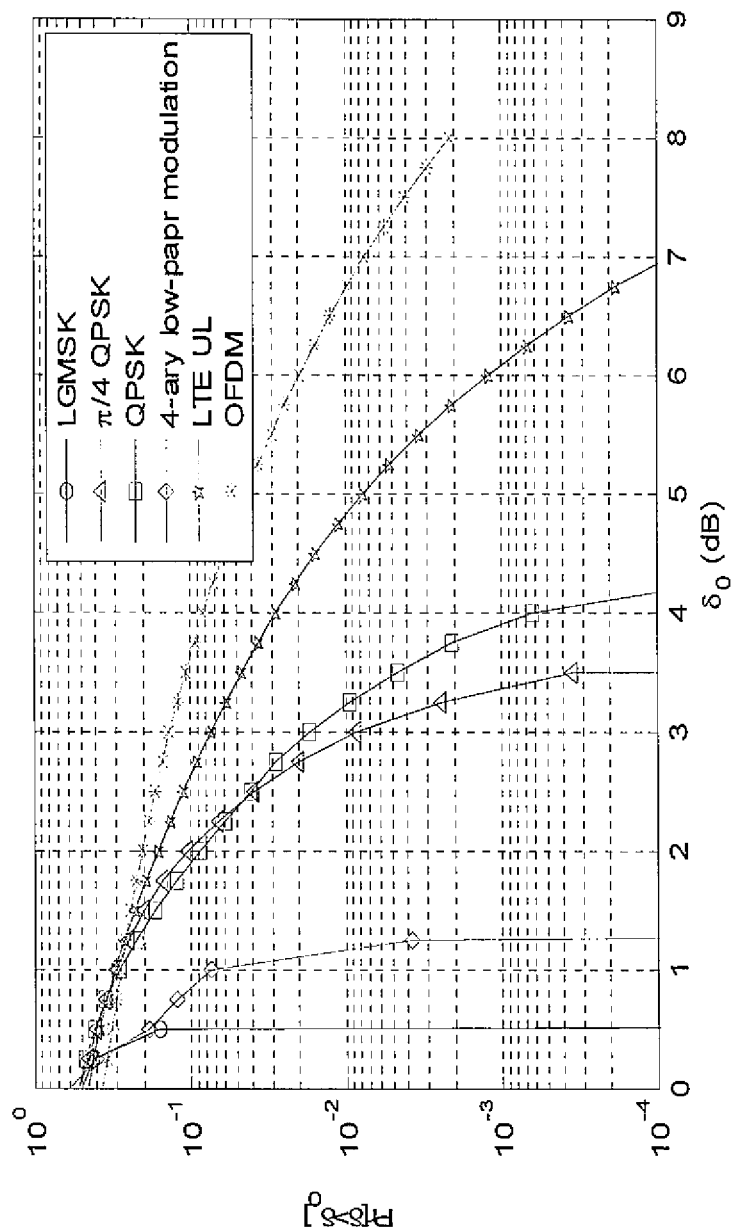
FIG. 8 is a graph of PAPR performance for the modulation schemes of FIG. 5 and a modulation scheme of an exemplary embodiment.

The PAPR performance of low-PAPR and other modulation waveform is shown in FIG. 8. Compared with π/4-QPSK with RRC filtering (rollover factor 0.3), the low-PAPR modulation is about 2 dB better in PAPR performance. Note that CPM has 0 dB (zero dB) PAPR property; this indicates that the low-PAPR waveform is about 1.3 dB from the ideal CPM modulation.

Figure 9:
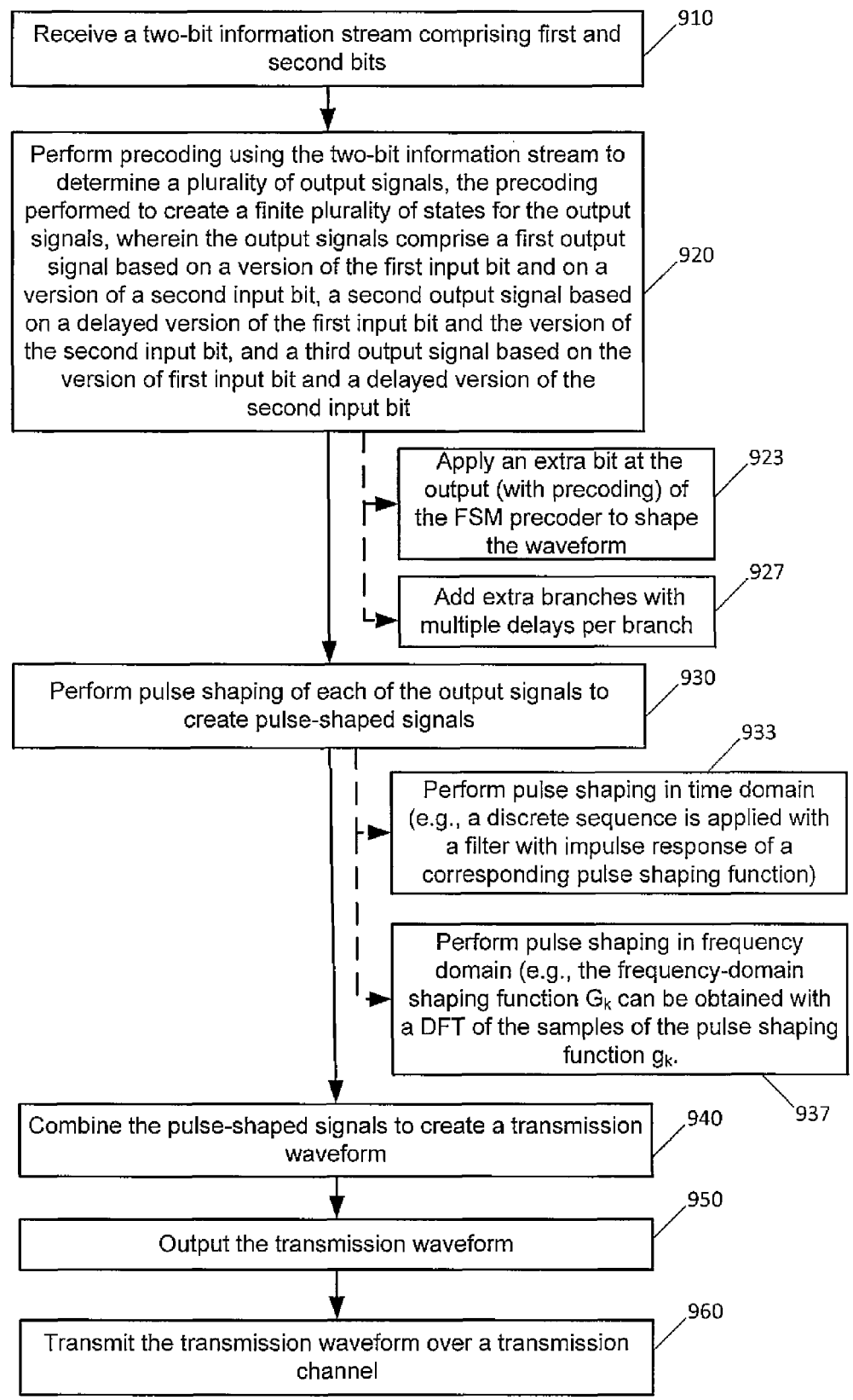
FIG. 9 is a block diagram of an exemplary logic flow diagram performed by a user equipment for low PAPR modulation, and that illustrates the operation of an exemplary method, a result of execution of computer program instructions embodied on a computer readable memory, and/or functions performed by logic implemented in hardware, in accordance with exemplary embodiments herein.

Turning to FIG. 9, a block diagram is shown of an exemplary logic flow diagram performed by a user equipment for low PAPR modulation. FIG. 9 further illustrates the operation of an exemplary method, a result of execution of computer program instructions embodied on a computer readable memory, and/or functions performed by logic implemented in hardware, in accordance with exemplary embodiments herein. The blocks in FIG. 9 may be considered to be interconnected means for performing the functions in the blocks. The blocks in FIG. 9 may be performed by the user equipment 110, e.g., at least in part by a modulator 600 (e.g., a modulator 122, implemented as logic in the transmitter 133, or the modulator 123, implemented as computer program code 129, or some combination of these).

The flow in FIG. 9 starts in block 910, when the modulator 600 receives a two-bit information stream comprising first and second bits (e.g., Bit 0 and Bit 1). In block 920, the modulator 600 (e.g., the FSM precoder 690) performs precoding using the two-bit information stream to determine a plurality of output signals (e.g., $u_{0,k}$, $u_{1,k}$, and $u_{2,k}$). The precoding is performed to create a finite plurality of states 750 for the output signals. The output signals comprise a first output signal (e.g., $u_{0,k}$) based on a version of the first input bit and on a version of a second input bit, a second output signal (e.g., $u_{1,k}$) based on a delayed version of the first input bit and the version of the second input bit, and a third output signal (e.g., $u_{2,k}$) based on the version of first input bit and a delayed version of the second input bit. Block 923 further illustrates that the FSM precoder 690 may have an extra branch that applies an extra bit at the output of the FSM precoder to shape the waveform, as described above. Block 927 additionally illustrates that the FSM precoder 690 may have added extra branches with multiple delays per branch, as described above.

In block 930, the modulator 600 (e.g., the pulse shaping functions 630) performs pulse shaping of each of the output signals to create pulse-shaped signals. Such pulse shaping, in block 933, may be performed in the time domain (e.g., a discrete sequence is applied with a filter with impulse response of a corresponding pulse shaping function), as described above. In block 937, the pulse shaping may be performed in the frequency domain (e.g., the frequency-domain shaping function $G_k$ can be obtained with a DFT of the samples of the pulse shaping function $g_k$). In block 940, the modulator combines the pulse-shaped signals to create a transmission waveform 650. This is performed by a combiner 640, which is shown in FIG. 6 as an adder but may be other elements, such as a subtraction device for some or all of the pulse-shaped signals or other elements. In block 950, the modulator 600 outputs the transmission waveform, e.g., output by the combiner 640. In block 960, the user equipment transmits the transmission waveform over a transmission channel, e.g., using the transmitter 133.

The examples of FIG. 1 and FIG. 9 use a user equipment 110 to create and transmit a low PAPR signal. However, other radio frequency devices using other radio access technologies may use the techniques herein, such as a Wi-Fi station, a Bluetooth transmitter, and the like.

Figure 10:
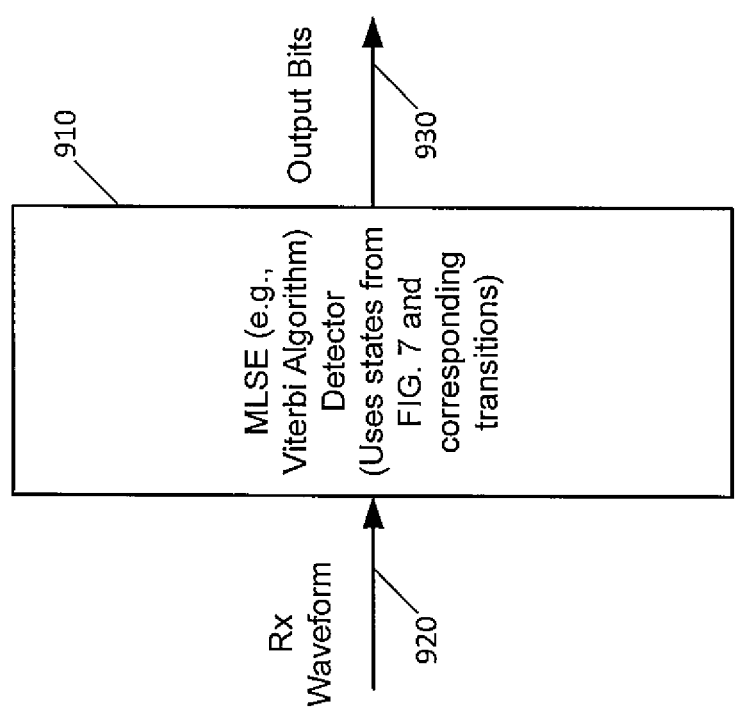
FIG. 10 is a block diagram of a detector for detecting a signal modulated using the techniques for low PAPR modulation.

Referring to FIG. 10, this figure is a block diagram of a detector for detecting a signal modulated using the techniques for low PAPR modulation. In FIG. 10, a detector 910 that uses MLSE (maximum likelihood sequence estimator) such as a Viterbi algorithm receives an Rx waveform 920 and outputs bits 930. The detector 910 could be detector 162, implemented as hardware logic in part of the receiver 167, or a detector 163, implemented as computer program code 153, which is loaded into the one or more processors 150 for execution, or some combination of these. The detector 910 can use the state-transition table from FIG. 7 to determine which output bits 930 should be selected and output. The detector 910 may use one type of MLSE algorithm such as a Viterbi algorithm to track state transition from an Rx waveform 920. Alternative, the detector 910 may use a frequency-domain detection approach, similar to that used for a CPM signal (see, e.g., Jun Tan, and Gordon L. Stuber, "Frequency-domain equalization for continuous phase modulation", Wireless Communications, IEEE Transactions on, vol. 4.5 (2005): 2479-2490).

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 125, 155 or other device) that may be any media or means that can contain or store the instructions for use by or in connection with an instruction execution system, apparatus, or device, such as a computer. A computer readable storage medium does not, however, encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third generation partnership project
BPSK Binary phase shift keying
CP Cyclic prefix
CPM Continuous phase modulation
dB decibel
DFT Discrete Fourier transform
DFT-S-OFDM Discrete Fourier transform-spread OFDM
EDGE Enhanced Data rates for GSM Evolution
FSM Finite state machine
GMSK Gaussian minimum shift keying
GSM Global System for Mobile Communications
LGMSK Linearized GMSK
LTE Long term evolution
NCE Network control entity
M2M Machine to machine
MLSE Maximum likelihood sequence estimator
MME Mobility Management Entity
mmW Millimeter wave
MTC Machine-type communication
OFDM Orthogonal frequency-division multiplexing
PA Power amplifier
PAPR Peak-to-average power ratio
QAM Quadrature amplitude modulation
QPSK Quadrature Phase Shift Keying
Rel Release
RMS Root-mean-square
RRC Raised root cosine
Rx Reception or Receiver
SIG Special interest group
SGW Serving gateway
Tx Transmission or Transmitter
UE User equipment (e.g., a wireless, mobile device)
UL Uplink (from a UE to a base station)

What is claimed is:

1. A method, comprising:
Receiving, by a modulator implemented as hardware logic in a transmitter, a two-bit information stream comprising first and second bits;
performing, by the modulator, precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit;
performing, by the modulator, pulse shaping of each of the output signals to create pulse-shaped signals;
combining, by the modulator, the pulse-shaped signals to create a transmission waveform; and
outputting, by the modulator, the transmission waveform.

2. The method of claim 1, wherein:
the version of the second input bit is a first version of the second input bit;
performing precoding further comprises:
applying a rotation to the first input bit to form the version of the first input bit, wherein the rotation applied to the first input bit is $j^k$, k=0 or 1; and
applying a rotation to a second version of the second input bit to form the first version of the second input bit, wherein the rotation applied to the second version of the input bit is $e^{-j\pi k/4}$.

3. The method of claim 2, wherein performing precoding further comprises:
multiplying the second input bit by a delayed version of the second version of the input bit to form the first version of the second input bit.

4. The method of claim 2, wherein:
the first input bit is one of $\{+1, -1\}$; and
the second input bit is one of $\{+1, +j\}$.

5. The method of claim 1, wherein performing precoding further comprises:
determining the first output signal by multiplying the version of the first input bit and the version of the second input bit;
determining the second output signal by multiplying the delayed version of the first input bit and the version of the second input bit; and
determining the third output signal by multiplying the version of first input bit and the delayed version of the second input bit.

6. The method of claim 1, wherein performing pulse shaping further comprises applying a pulse shaping function to each of the first, second, and third output signals, wherein each pulse shaping function comprises:

$$c_i(t) = w_i(t) \cdot w_i(t+T),$$

where l=0, 1, T is a sampling period, $$w_l(t) = \begin{cases} \dfrac{\sin[2^{l+1} h\pi q(t)]}{\sin[2^l h\pi]} & 0 \le t \le LT \\ w_l(2LT - t) & LT < t \le 2LT \\ 0 & \text{elsewhere} \end{cases},$$

where h = ¼, and a partial response function q(t) takes the form of:
$q(t) = \int_{-\infty}^{t} f(\tau)d\tau$, $f(t)$ is a shaping function with non-zero value defined over [0, LT], and $$f(t) = f(LT-t)$$

$\int_0^{LT} f(\tau)d\tau = q(LT) = ½$.

7. The method of claim 6, wherein:
the pulse shaping functions are as follows:

$$g_0(t) = c_0(t)c_1(t)$$

$$g_1(t) = c_0(t+T)c_1(t)$$

$$g_2(t) = c_0(t)c_0(t+T),$$

where $g_0(t)$ is applied to the first output signal to create a first pulse-shaped signal, $g_1(t)$ is applied to the second output signal to create a second pulse-shaped signal, $g_2(t)$ is applied to the third output signal to create a third pulse-shaped signal; and
combining the pulse-shaped signals comprises adding the first, second and third pulseshaped signals to create the transmission waveform.

8. The method of claim 1, wherein performing precoding further produces a fourth output signal on an extra branch, the fourth output signal based on the delayed version of the first input bit and a delayed version of the second input bit.

9. The method of claim 1, wherein performing precoding further comprises adding one or more branches producing additional output signals, wherein each of the one or more branches having multiple delays per branch.

10. The method of claim 1, wherein performing pulse shaping further comprises performing pulse shaping for each of the output signals in a time domain by applying a discrete sequence with a filter with an impulse response of corresponding pulse shaping function.

11. The method of claim 1, wherein performing pulse shaping is performed for each output signal using a corresponding pulse shaping function and performing pulse shaping further comprises performing pulse shaping for each of the output signals in a frequency domain using a frequency-domain shaping function that is obtained with a discrete Fourier transform of samples of a corresponding one of the pulse shaping functions.

12. An apparatus, comprising:
a precoder receiving a two-bit information stream comprising first and second bits, the precoder configured to perform precoding using the two-bit information stream to determine a plurality of output signals, the precoding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit;
a plurality of pulse shaping functions, each pulse shaping function performing pulse shaping of each of the output signals to create pulse-shaped signals;
a combiner configured to combine the pulse-shaped signals to create a transmission waveform and configured to output the transmission waveform.

13. The apparatus of claim 12, wherein:
the version of the second input bit is a first version of the second input bit;
the precoder further comprises:
a multiplier that applies a rotation to the first input bit to form the version of the first input bit, wherein the rotation applied to the first input bit is $j^k$, k=0 or 1; and
a multiplier that applies a rotation to a second version of the second input bit to form the first version of the second input bit, wherein the rotation applied to the second version of the input bit is $e^{-j\pi k/4}$.

14. The apparatus of claim 13, wherein the precoder further comprises:
a delay that delays the second version of the input bit to create a delayed version of the second version of the second input bit; and
a multiplier that multiplies the second input bit by the delayed version of the second version of the second input bit to form the second version of the second input bit.

15. The apparatus of claim 13, wherein:
the first input bit is one of {+1, −1}; and
the second input bit is one of {+1, +j}.

16. The apparatus of claim 12, wherein the precoder further comprises:
a multiplier that determines the first output signal by multiplying the version of the first input bit and the version of the second input bit;
a multiplier that determines the second output signal by multiplying the delayed version of the first input bit and the version of the second input bit; and
a multiplier that determines the third output signal by multiplying the version of first input bit and the delayed version of the second input bit.

17. The apparatus of claim 12, wherein each pulse shaping function comprises:

$$c_l(t) = w_l(t) \cdot w_l(t+T),$$

where l=0, 1, T is a sampling period, $$w_l(t) = \begin{cases} \dfrac{\sin[2^{l+1} h\pi q(t)]}{\sin[2^l h\pi]} & 0 \le t \le LT \\ w_l(2LT - t) & LT < t \le 2LT \\ 0 & \text{elsewhere} \end{cases},$$

where h=¼, and a partial response function q(t) takes the form of:
$q(t) = \int_{-\infty}^{t} f(\tau)d\tau$, $f(t)$ is a shaping function with non-zero value defined over [0, LT], and $$f(t) = f(LT-t)$$

$\int_0^{LT} f(\tau)d\tau = q(LT) = ½$.

18. The apparatus of claim 17, wherein:
the pulse shaping functions are as follows:

$$g_0(t) = c_0(t)c_1(t)$$

$$g_1(t) = c_0(t+T)c_1(t)$$

$$g_2(t) = c_0(t)c_0(t+T),$$

where $g_0(t)$ is applied to the first output signal to create a first pulse-shaped signal, $g_1(t)$ is applied to the second output signal to create a second pulse-shaped signal, $g_2$(t) is applied to the third output signal to create a third pulse-shaped signal; and the combiner is an adder that adds the first, second and third pulse-shaped signals to create the transmission waveform.

19. The apparatus of claim 12, further comprising one or more processors and one or more memories including computer program code, wherein the one or more memories and the computer program code configured, with the one or more processors, to cause the apparatus to implement the precoder, the plurality of pulse shaping functions, and the combiner.

20. A computer program product embodied in a non-transitory computer memory and comprising instructions the execution of which by a processor results in performing operations that comprise receiving a two-bit information stream comprising first and second bits;

performing precoding using the two-bit information stream to determine a plurality of output signals, the preceding performed to create a finite plurality of states for the output signals, wherein the output signals comprise a first output signal based on a version of the first input bit and on a version of a second input bit, a second output signal based on a delayed version of the first input bit and the version of the second input bit, and a third output signal based on the version of first input bit and a delayed version of the second input bit;

performing pulse shaping of each of the output signals to create pulse-shaped signals;

combining the pulse-shaped signals to create a transmission waveform; and outputting the transmission waveform.

* * * * *

UNITED STATES PATENT AND TRADEMARK OFFICE
CERTIFICATE OF CORRECTION

| | | |
|---|---|---|
| PATENT NO. | : 9,160,579 B1 | Page 1 of 1 |
| APPLICATION NO. | : 14/225803 | |
| DATED | : October 13, 2015 | |
| INVENTOR(S) | : Jun Tan, Weidong Yang and Rapeepat Ratasuk | |

It is certified that error appears in the above-identified patent and that said Letters Patent is hereby corrected as shown below:

Claims

In Claim 6:

Column 17, line 1, "where l=0, 1, T" should be deleted and --where $l=0, 1, T$-- should be inserted.

Column 17, line 13, "[0, LT]" should be deleted and --[0, $LT$]-- should be inserted.

In Claim 17:

Column 18, line 41, "where l=0, 1, T" should be deleted and --where $l=0, 1, T$-- should be inserted.

Column 18, line 53, "[0, LT]" should be deleted and --[0, $LT$]-- should be inserted.

In Claim 20:

Column 20, line 3, "preceding" should be deleted and --precoding-- should be inserted.

Signed and Sealed this
First Day of March, 2016

Michelle K. Lee
*Director of the United States Patent and Trademark Office*